3,194,836
PREPARATION OF PANTOTHENAMIDE
Ralph H. Beutel, Newark, N.J., assignor to Merck & Co., Inc., Rahway, N. J., a corporation of New Jersey
No Drawing. Filed Dec. 19, 1961, Ser. No. 160,657
1 Claim. (Cl. 260—561)

This invention relates to the preparation of pantothenamide. More particularly, it is concerned with a method of preparing pantothenamide by the reaction of $\alpha,\gamma$-dihydroxy-$\beta,\beta$-dimethylbutyrolactone with $\beta$-alaninamide.

The preparation of pantothenamide by the reaction of pantothenonitrile with a hydrolyzing agent such as hydrogen peroxide has been described in the art. However, the product obtained in accordance with this method of preparation is a viscous liquid.

It is an object of the present invention to provide pantothenamide in crystalline form. Another object is to provide a convenient method for the preparation of pantothenamide in solid form by reacting $\alpha,\gamma$-dihydroxy-$\beta,\beta$-dimethylbutyrolactone with $\beta$-alaninamide. Other objects will be apparent from the detailed description of this invention hereinafter provided.

In accordance with an embodiment of the present invention, it is now found that pantothenamide is conveniently prepared by intimately contacting $\alpha,\gamma$-dihydroxy-$\beta,\beta$-dimethylbutyrolactone with $\beta$-alaninamide. Thus, the reaction is conveniently carried out by merely mixing the reactants at about room temperature, allowing the reaction mixture to stand for sufficient time to complete formation of the pantothenamide and recovering the product thus formed. The reaction is preferably effected in the presence of a suitable solvent for the reactants such as methanol and the like. Thus, when the reaction is carried out in the presence of a small amount of methanol, the pantothenamide precipitates out of solution in the form of a solid during the reaction. The product so obtained can be purified by dissolving it in a suitable solvent or mixture of solvents at elevated temperatures and then cooling the solution, thereby precipitating the product from solution. Thus, this recrystallization can be conveniently effected by dissolving the product in a mixture of isopropanol and ethyl acetate and then cooling the resulting solution to precipitate the product.

Pantothenamide can be used as a convenient source of pantothenic acid activity in pharmaceutical products such as multivitamin compositions.

The following example illustrates methods of carrying out the processes of the present invention and preparing d-pantothenamide in crystalline form.

*Example*

A methanol solution (485 g.) containing 71.7% 1-$\alpha,\gamma$-dihydroxy-$\beta,\beta$-dimethylbutyrolactone by weight is added to $\beta$-alaninamide prepared as described below at a temperature of 30° C. or below, and allowed to stand at 25–30° C. for 16 hours. To the reaction mixture is added 1000 ml. of isopropanol and the resulting mixture heated under reflux to dissolve the pantothenamide. The resulting solution is cooled below reflux temperature and 4.5 g. of activated charcoal added with stirring. The solution is then filtered and the filter cake washed with 50 ml. of warm isopropanol. To the clear filtrate is added 1000 ml. of ethyl acetate and the resulting solution is allowed to stand at 0–5° C. for five hours. During this time pantothenamide precipitates out. The d-pantothenamide is recovered by filtration, washed twice with 150 ml. of a mixture of ethyl acetate and isopropanol (1:1 by volume), and dried at 50° C. for three hours in a forced air dryer to yield a product melting at 114–116° C.

The $\beta$-alaninamide used in the above example is prepared as follows:

To 450 ml. of sulfuric acid is added 256 g. of $\beta$-aminopropionitrile containing 10.7% water while maintaining the temperature at 80–85° C. with external cooling. The reaction mixture is heated to 90° C., aged for two hours, cooled to 60° C., and then quenched by adding it slowly to a mixture of 1400 ml. of pyridine and 1700 ml. of methanol precooled to 0–5° C. During the addition of the reaction mixture the temperature is kept below 35° C. with external cooling. The mixture is cooled to 0–5° C. and aged for two hours. The crystalline $\beta$-alaninamide sulfate which precipitates is recovered by filtration, washed twice with 150 ml. and then once with 300 ml. of methanol, and dried to yield a product having a melting point of 182–186° C.

This product is added to 3600 ml. of methanol and 105 g. of anhydrous ammonia passed into the methanol solution while maintaining the temperature at 30° C. or below. The mixture is aged to two hours at room temperature and then filtered to remove the precipitated ammanium sulfate; the filter cake being washed three times with 250 ml. of methanol. The combined filtrate and washes are concentrated at a maximum temperature of 40° C. under reduced pressure. To the residue so obtained is added 400 ml. of methanol and this solvent removed at a temperature of 40° C. under reduced pressure. The resulting residue consisting of $\beta$-alaninamide is obtained as an oil free of ammonia.

Various changes and modifications of the invention can be made and, to the extent that such variations incorporate the spirit of this invention, they are intended to be included within the scope of the appended claim.

What is claimed is:

The process which comprises mixing a methanol solution of 1-$\alpha,\gamma$-dihydroxy-$\beta,\beta$-dimethylbutyrolactone with $\beta$-alaninamide at room temperature to form d-pantothenamide, thereafter adding isopropanol and heating to dissolve said d-pantothenamide, adding ethyl acetate to the resulting solution, and recovering crystalline d-pantothenamide from said cooled solution.

References Cited by the Examiner

UNITED STATES PATENTS 2,375,885   5/45   Babcock _____ 260—561 X
2,680,767   6/54   Snell et. al _____ 260—561

OTHER REFERENCES

Baddiley et al.: J. Chem. Soc. (London), p. 2811 (1954).

Lange's Handbook of Chemistry, 9th Ed., pp. 383 and 538–539, Handbook Publishers, Inc., Sandusky Ohio (1956).

MacArdle: "Use of Solvents," pp. 3, 74, 82 and 151–155, D. Van Nostrand Co., N.Y. (1925).

Vernsten et al.: Jour. Am. Chem. Soc., vol. 76, p. 5811 (1954).

WALTER A. MODANCE, *Primary Examiner.*
DUVAL T. McCUTCHEN, *Examiner.*